(12) United States Patent
Murphy et al.

(10) Patent No.: US 11,035,951 B1
(45) Date of Patent: Jun. 15, 2021

(54) RADAR BASED GUIDANCE SYSTEM PERCEIVING CONTENTS OF A CONTAINER

(71) Applicant: Amazon Technologies, Inc., Seattle, WA (US)

(72) Inventors: Sean Murphy, Seattle, WA (US); Sachin R. Kothari, Issaquah, WA (US); Jungtao Liu, Saratoga, CA (US); Durgaprasad Kashinath Shamain, Los Gatos, CA (US); Celalettin Umit Bas, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 16/369,573

(22) Filed: Mar. 29, 2019

(51) Int. Cl.
*G01S 13/90* (2006.01)
*B65D 17/42* (2006.01)
*B65D 17/30* (2006.01)
*G01S 13/00* (2006.01)

(52) U.S. Cl.
CPC .......... *G01S 13/9056* (2019.05); *B65D 17/30* (2018.01); *B65D 17/42* (2018.01); *G01S 13/9027* (2019.05)

(58) Field of Classification Search
CPC . G01S 13/9056; G01S 13/9027; B65D 17/42; B65D 17/30
See application file for complete search history.

(56) References Cited

U.S. PATENT DOCUMENTS

| | | | | |
|---|---|---|---|---|
| 6,480,141 B1* | 11/2002 | Toth | ................. | G01N 22/00 324/639 |
| 6,529,154 B1* | 3/2003 | Schramm, Jr. | .......... | G01S 13/89 342/195 |
| 6,694,852 B1* | 2/2004 | Ours | ................. | B65B 69/0033 414/412 |
| 6,870,162 B1* | 3/2005 | Vaidya | ................. | H04N 5/217 250/330 |
| 7,378,855 B2* | 5/2008 | Moshe | ................. | G01N 22/00 324/637 |
| 7,527,205 B2* | 5/2009 | Zhu | ................. | G06K 7/10891 235/462.14 |
| 7,720,567 B2* | 5/2010 | Doke | ................. | B65B 69/0033 700/230 |
| 7,859,408 B2* | 12/2010 | Tuttle | ................. | G01S 13/74 340/572.1 |

(Continued)

*Primary Examiner* — Bernarr E Gregory
(74) *Attorney, Agent, or Firm* — Patterson + Sheridan, LLP

(57) ABSTRACT

Embodiments herein describe a scanning station for identifying an air gap between one or more items stored in a container (e.g., a cardboard box) and a surface of the container (e.g., a top lid of the cardboard box). After identifying the air gap, in one embodiment, the scanning station provides instructions to a downstream cutting station where the container is cut opened. In one embodiment, the scanning station includes one or more articulating arms that each includes a scanner (e.g., a radar sensor) attached on an end of the articulating arm facing the container. Moving the articulating arms along the boundaries of the container provides a 3D image of the inside of the container. By processing this image, the scanning station can identify an air gap along a desired cut line as well as a thickness of the sides of the container.

20 Claims, 14 Drawing Sheets

(56) References Cited

U.S. PATENT DOCUMENTS

| | | | | |
|---|---|---|---|---|
| 7,944,356 | B2 * | 5/2011 | Tuttle | G01S 13/751 |
| | | | | 340/572.1 |
| 8,047,053 | B2 * | 11/2011 | Call | G01N 1/405 |
| | | | | 73/28.01 |
| 10,005,564 | B1 * | 6/2018 | Bhatia | B64C 1/22 |
| 10,698,102 | B2 * | 6/2020 | Park | G01S 13/89 |
| 2001/0003939 | A1 * | 6/2001 | Liu | B26D 7/015 |
| | | | | 83/800 |
| 2006/0214835 | A1 * | 9/2006 | Lee | G01S 13/89 |
| | | | | 342/22 |
| 2012/0212365 | A1 * | 8/2012 | Feil | G01S 13/88 |
| | | | | 342/107 |

\* cited by examiner

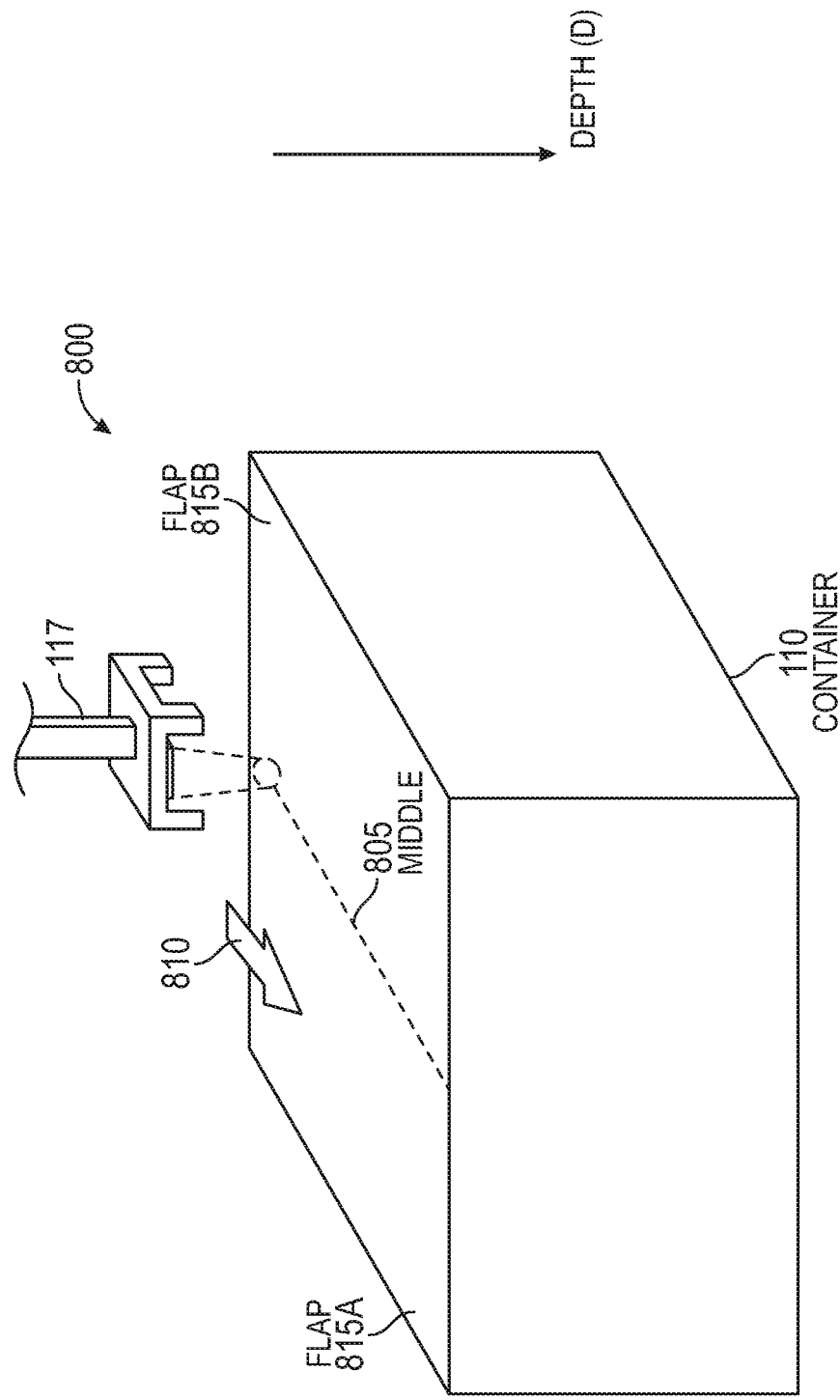

US 11,035,951 B1

RADAR BASED GUIDANCE SYSTEM PERCEIVING CONTENTS OF A CONTAINER

BACKGROUND

The present invention relates to identifying an air gap for removing a top surface of a container.

A warehouse can receive containers (e.g., cardboard boxes) of various sizes and shapes that store additional items. For example, a supplier may ship a plurality of smaller items in a larger container. The containers are moved to a decant stations in the warehouse where an associate opens the container and removes the smaller items inside. The smaller items can then be stowed and shipped in response to customer orders.

Opening the containers at the decant station, however, prevents several challenges. The thickness of the sides of the containers can vary (e.g., the suppliers may use cardboard boxes with different wall thicknesses). Moreover, an air gap between the items in the container and the top surface of the container may vary. Thus, the associate cannot simply use the deepest setting of a box cutter (to compensate for the various thicknesses of the sides of the container) when slicing open the top surface since the associate may inadvertently cut and damage the items in the container. Further, requesting that the suppliers leave a minimum gap ensures that the cutter does not contact the items 605 regardless of the current location of the cutter on the cut line. However, in other embo

BRIEF DESCRIPTION OF DRAWINGS

FIG. 8 illustrates scanning along a middle of a container to identify an air gap below its top surface, according to various embodiments.

DETAILED DESCRIPTION

Embodiments herein describe a scanning station for identifying an air gap between one or more items stored in a container (e.g., a cardboard box) and a surface of the container (e.g., a top surface of the cardboard box). After identifying the air gap, in one embodiment, the scanning station provides instructions to a downstream cutting station where an associate or a cutting apparatus opens the container. For example, the scanning station may indicate a path on the surface of the container for the associate or cutting apparatus to cut as well as a blade depth for a box cutter. Using these instructions, the associate or cutting apparatus can open or remove the surface to provide access to the items stowed inside.

In one embodiment, the scanning station includes one or more articulating arms that each includes a scanner (e.g., a radar sensor) attached on an end of the articulating arm facing the container. Moving the articulating arms along the boundaries of the container provides a 3D image of the inside of the container. By processing this image, the scanning station can identify an air gap along a desired cut line as well as a thickness of the sides of the container. The scanning station can then provide a blade depth to the cutting station that ensures the blade cuts through the side of the container but does not cut the items in the container. Moreover, if the items are too close to the surface (e.g., there is an insufficient air gap), the scanning station can evaluate several different cut locations to identify a cut line where the air gap is sufficient and provide the corresponding location to the downstream cutting station.

Figure 1:
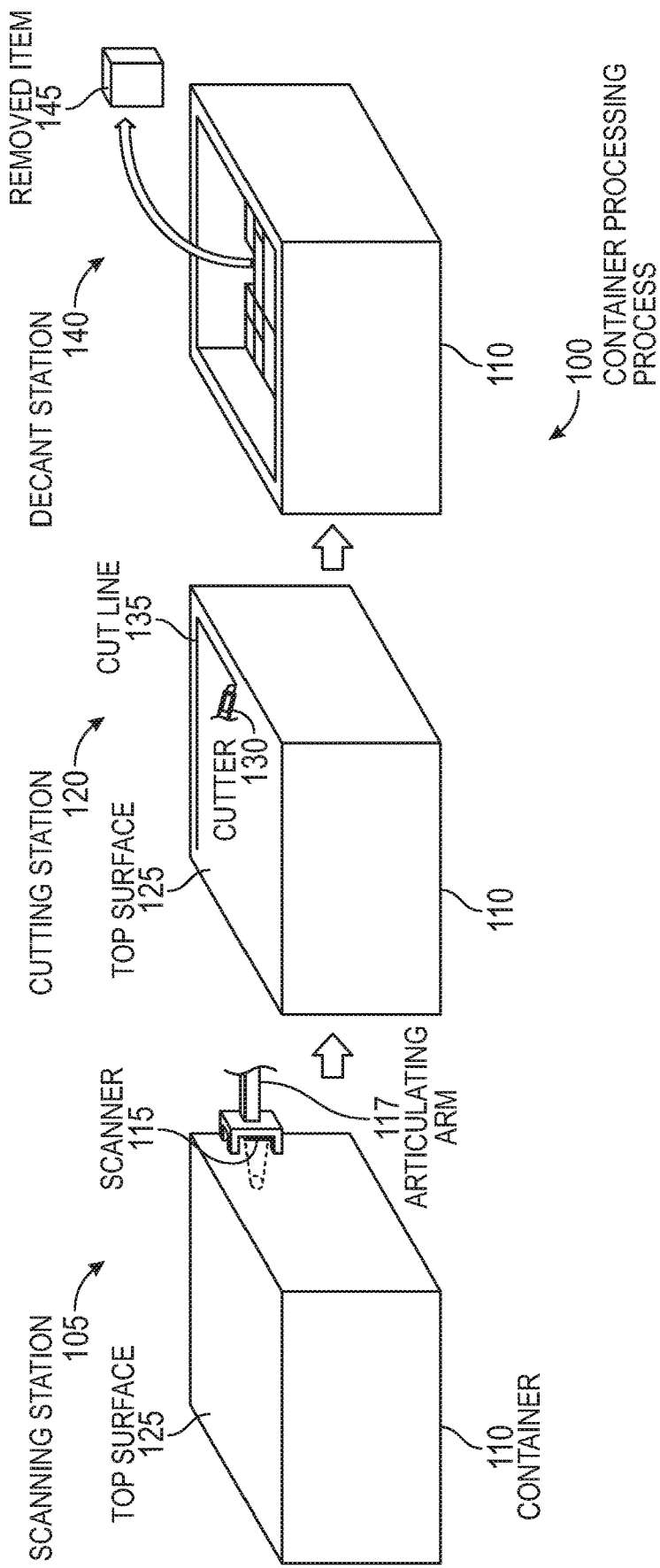
FIG. 1 illustrates removing a top surface of a container using a scanner, according to various embodiments.

FIG. 1 illustrates removing a top surface 125 of a container 110 using a scanner, according to various embodiments. As shown, FIG. 1 illustrates a container processing process 100 that includes a scanning station 105, a cutting station 120, and a decant station 140. The scanning station 105 includes a scanner 115 attached to an end of an articulating arm 117 that faces the container 110 (e.g., a sealed cardboard box). As described in more detail below, the articulating arm 117 moves the scanner 115 (e.g., an electromagnetic scanner that emits a wireless electromagnetic signal that penetrates through the material of the container) across at least one surface of the container to identify an air gap between a top surface 125 of the container 110 and the items in the container 110.

The container 110 can be made out of cardboard, plastic, polymer, or other type of material suitable for storing items for shipping. Moreover, while the figures illustrate a cubical shape, the container 110 is not limited to such and can be any shaped container.

In one embodiment, the scanning station 105 identifies a cut line and a blade depth to use for opening the container 110. This information is passed to the cutting station 120 which illustrates a cutter 130 cutting the top surface 125 along a cut line 135. In one embodiment, the cutter 130 (e.g., a box cutter) may be an apparatus controlled by an associate who sets the blade depth of the cutter 130 and selects the cut line 135 in response to information learned by the scanning station 105. Doing so enables the associate to cut through the top surface 125 without damaging the items stored in the container 110. In another embodiment, the cutter 130 may be attached to a cutting apparatus (e.g., a machine) that receives the information from the scanning station 105 and automatically sets the cutting depth of the cutter 130 (e.g., a saw or a tool with a sharp edge) and cuts the top surface 125 along the cut line 135 without damaging the underlying items.

The decant station 140 illustrates the container 110 after the top surface 125 has been removed at the cutting station 120. In this example, the cut line 135 extends around the periphery of the top surface 125 so that essentially the entire surface 125 has been removed. An associate or removal apparatus can then remove the items stored in the container 110. In this example, the item 145 has been removed from the container 110 and can then be stowed in a warehouse (e.g., in a rack or tote).

While FIG. 1 illustrates removing the entire top surface 125 of the container 110, in other embodiments, the top surface 125 may include flaps that meet in the middle of the surface 125. The cutting station 120 can cut the middle of the surface 125 which permits the flaps to open and enables the associate at the decant station 140 to remove the items. However, even if the top surface 125 includes flaps, the cutting station 120 can still cut around the periphery of the top surface 125 as shown so that the entire surface 125 can be removed.

Figure 2:
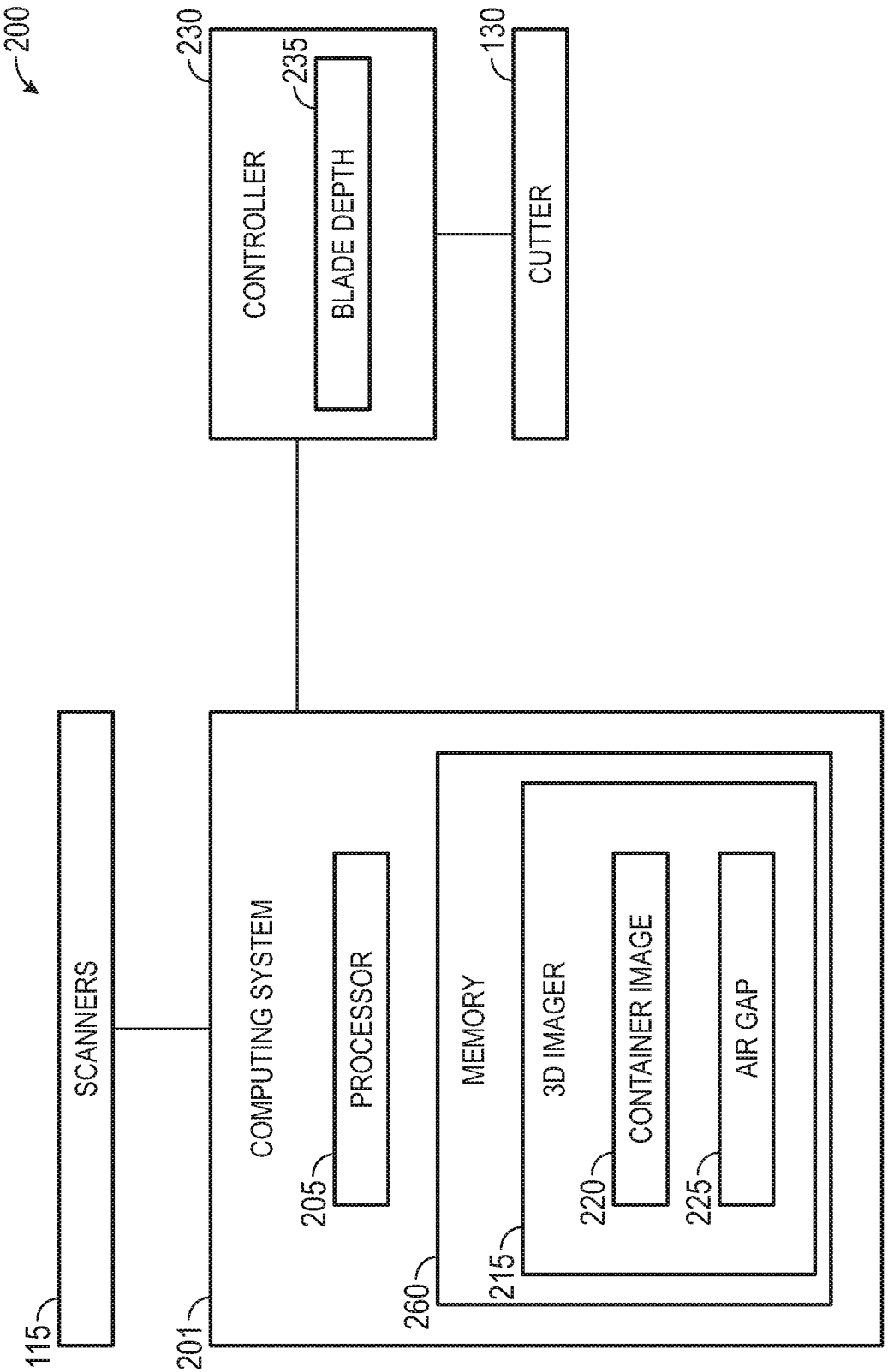
FIG. 2 is a system for removing a top surface of a container, according to various embodiments.

FIG. 2 is a system 200 for removing a top surface of a container, according to various embodiments. For example, the system 200 may be part of the container processing process 100 used to remove the top surface 125 of the container 110.

The system 200 includes scanners 115 which each scan at least one side of the container 110 in order to identify an air gap between the items in the container and the top surface of the container. If the cut line extends around the periphery of the top surface (as shown in FIG. 1), the scanners 115 need only to detect items a few centimeters into the box (e.g., less than five centimeters) around the periphery of the box. For example, the scanning station may include a scanner 115 for each side of the box. By emitting electromagnetic signals into the respective sides, the system 200 can generate a 3D image around the periphery of the box and identify the locations where there is (or is not) an air gap.

In one embodiment, the scanners 115 are radar sensors that emit radar in the frequency of 30 MHz to 500 GHz. In one embodiment, the scanners 115 are a synthetic aperture radar (SAR) scanners which use the movement of the scanners 115 across a target region (e.g., one or more sides of the container) to simulate a large antenna or aperture electronically for generating high-resolution sensing images. To create a SAR image, successive pulses of radio waves are transmitted towards a side of the container, and the echo of each pulse is received and recorded. In one embodiment, the pulses are transmitted and the echoes received using a single beam-forming antenna, with wavelengths of a meter (300 MHZ) down to several millimeters (<300 GHz). As the SAR scanner 115 moves across the surface of the container, the antenna location relative to the surface of the container changes with time. Signal processing of the successive recorded radar echoes allows the combining of the recordings from these multiple antenna positions. This process forms the synthetic antenna aperture and allows the creation of higher-resolution images than would otherwise be possible with a given physical antenna that does not move.

Alternatively, rather than using SAR, the scanner can use other electromagnetic signals that permit the system 200 to see within the container. For example, the scanners 115 can be microwave scanners that range from 300 MHz (1 meter wavelength) to 300 GHz (1 mm wavelength). In another example, the scanner 115 may use electromagnetic signals with wavelengths less than 10 nm, and more specifically less than 1 nm, to generate a view inside of the container.

The computing system 201 includes a processor 205 and memory 210. In one embodiment, the computing system 201 is disposed locally in the same warehouse as the scanners 115. For example, the computing system 201 may be a controller that moves the scanners 115. In another embodiment, the computing system 201 may be disposed remotely from the scanners 115. The computing system 201 may be part of a data center or a cloud computing application that is communicatively coupled to the scanners 115.

The processor 205 represents any number of processing elements which can each include any number of processing cores. The memory 210 can include volatile and non-volatile memory elements which store a 3D imager 215 (e.g., a software application). The 3D imager 215 receives sensor data from the scanners 155 which it uses to generate one or more images 220 of the container being scanned. The 3D imager 215 can evaluate these images 220 to identify an air gap 225 along a desired cut line. For example, the system 200 may include respective scanners 115 that each scans a respective side of the container. The 3D imager 215 generates a container image 220 from the sensor data which illustrates the view of the inside of the container around its periphery. As mentioned above, the image 220 may not extend all the way through the container, but instead extend only a few centimeters into the inside of container relative to its sides. For example, the image 220 may include a view of the contents in the container where the top surface intersects all the sides of the container.

The 3D imager 215 can use the air gap 225 to provide cutting information or instructions to the controller 230. For example, the 3D imager 215 can provide a blade depth 235 to the controller 230 which ensures the cutter 130 cuts through the top surface of the container but does not contact the items within the container. Moreover, the 3D imager 215 may instruct the controller 230 where the cut line should be, which may move depending on whether the 3D imager 215 has detected a sufficient air gap 225 within the container.

Although the system 200 transmits the cutting information or instructions to the controller 230 which controls the cutter 130, in another embodiment, the cutting information may be displayed to an associate. For example, the 3D imager 215 may display a graphical representation of the container and highlight a cut line for the associate. The 3D imager 215 can also display the blade depth 235 to the associate who can set her cutter 130 (e.g., a box cutter) to the appropriate depth before cutting the container along the cut line.

Figure 3:
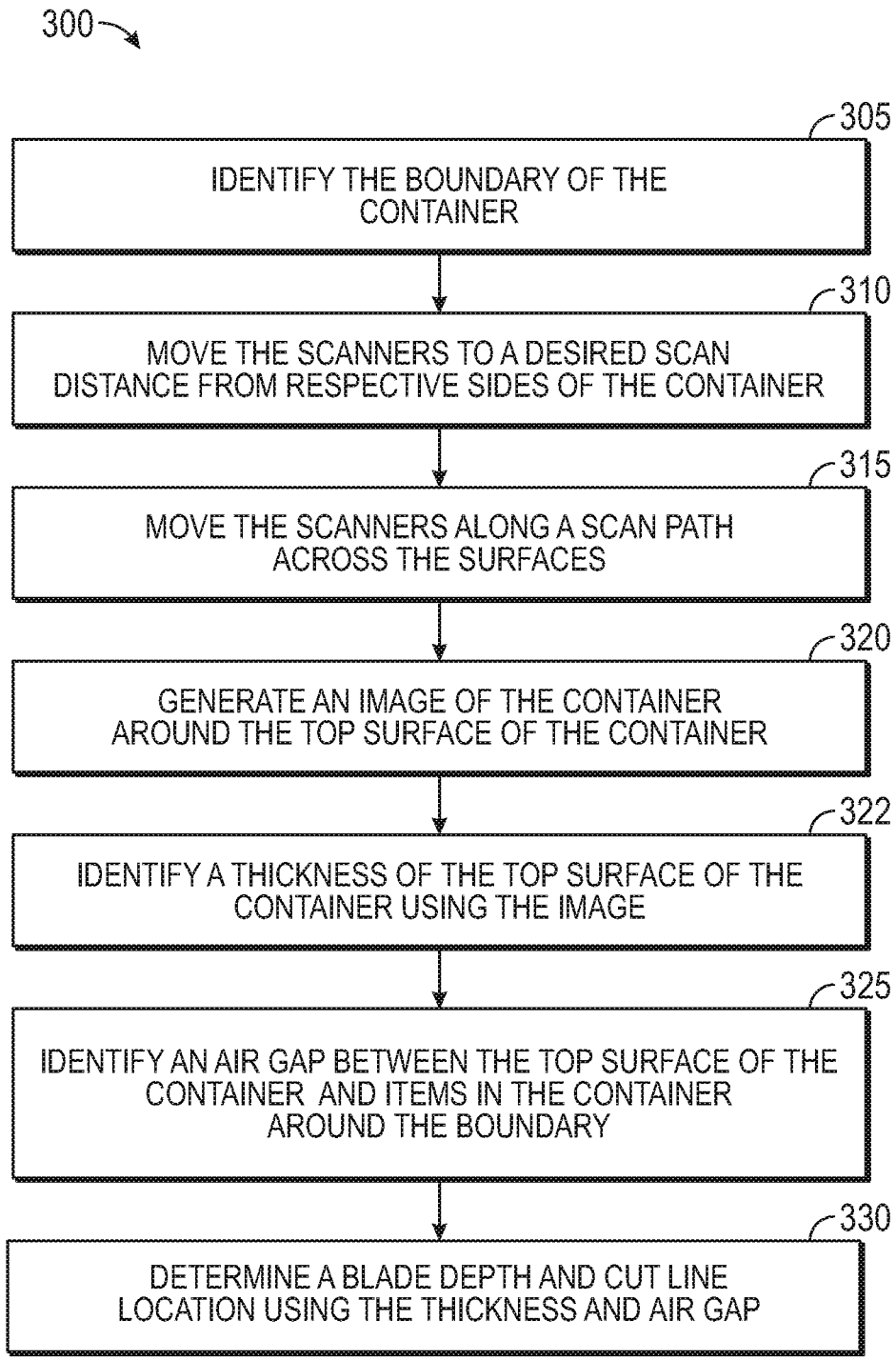
FIG. 3 is a flowchart for scanning a container to identify an air gap below its top surface, according to various embodiments.

FIG. 3 is a flowchart of a method 300 for scanning a container to identify an air gap below its top surface, according to various embodiments. For clarity, the method 300 is discussed in tandem with FIGS. 4-6.

Figure 4A:
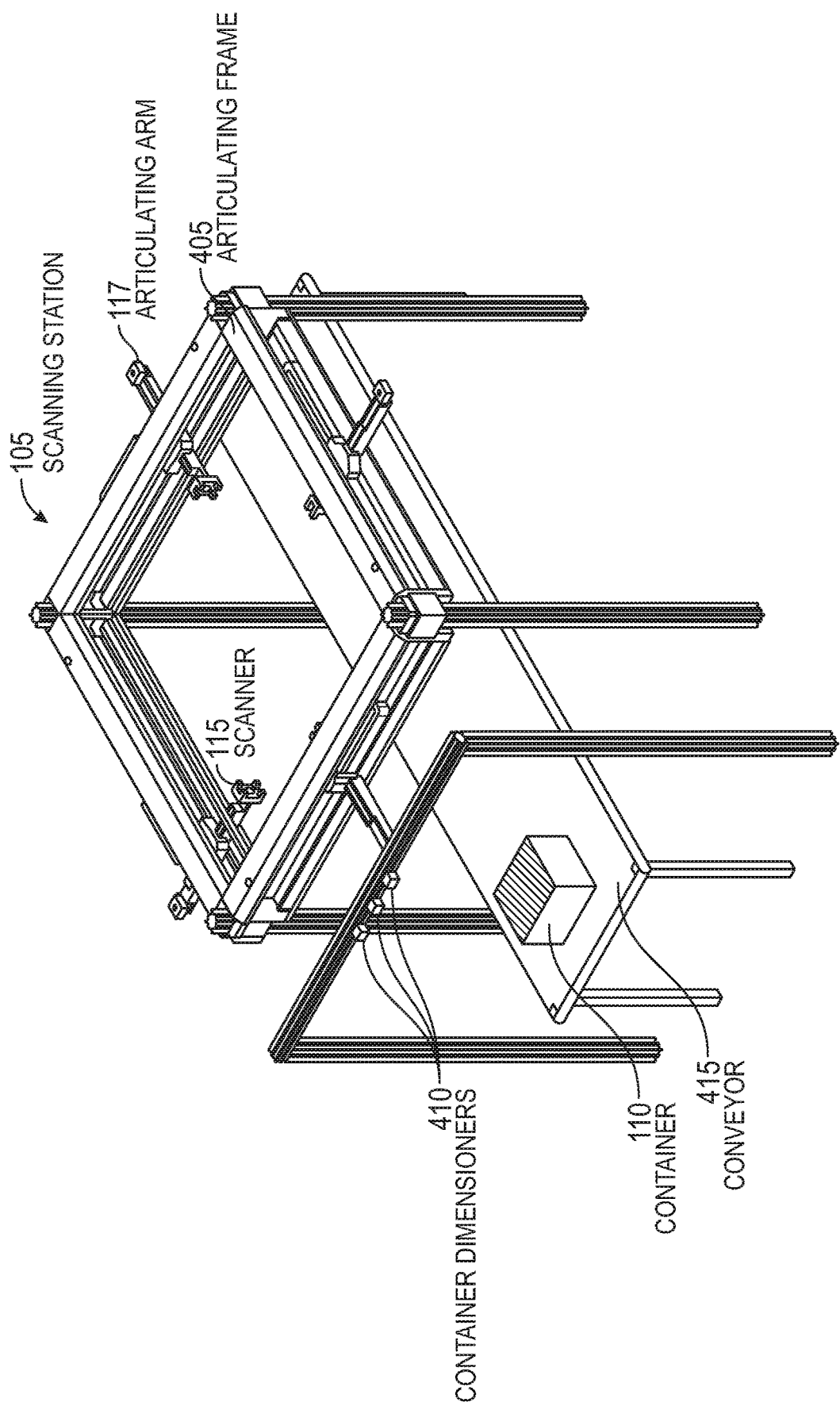
FIGS. 4A-4G illustrate scanning a container, according to various embodiments.

At block 305, the scanning station identifies the boundary of the container. That is, the scanning station identifies the location of the surface on the container to be scanned by the scanners in the station. As an example, FIG. 4A illustrates a scanning station 105 that includes container dimensioners 410 for identifying the boundary of the container 110 moving along a conveyor 415. The container dimensioners 410 can identify edges of the container 110 which then are used to identify the various surfaces or sides of the container 110. In one embodiment, the container dimensioners 410 are depth sensor or time of flight sensor which identifies the location of the various surfaces of the container 110 in 3D space. In another embodiment, the container dimensioners 410 are ultrasonic sensors that can identify the location and orientation of the container 110. One advantage of using container dimensioners 410 is that containers 110 with various sizes and boundaries can be processed using the same scanning station 105. However, if the scanning station 105 receives only the same sized containers 110, then the container dimensioners 410 may be omitted so long as the container 110 is placed in a predictable location and orientation on the conveyor 415.

While the container dimensioners 410 are illustrated as part of the scanning station 105, in another embodiment, the dimensioners 410 may be part of an upstream receiving station. In addition to identifying the boundary of the container 110, the upstream receiving station may arrange the container on the conveyor 415 in a desired orientation (where at least four sides of the container 110 are parallel with the direction in which the conveyor travels). Doing so may make it easier for the articulating arms 117 to scan the sides of container 110 in later steps.

Figure 4B:
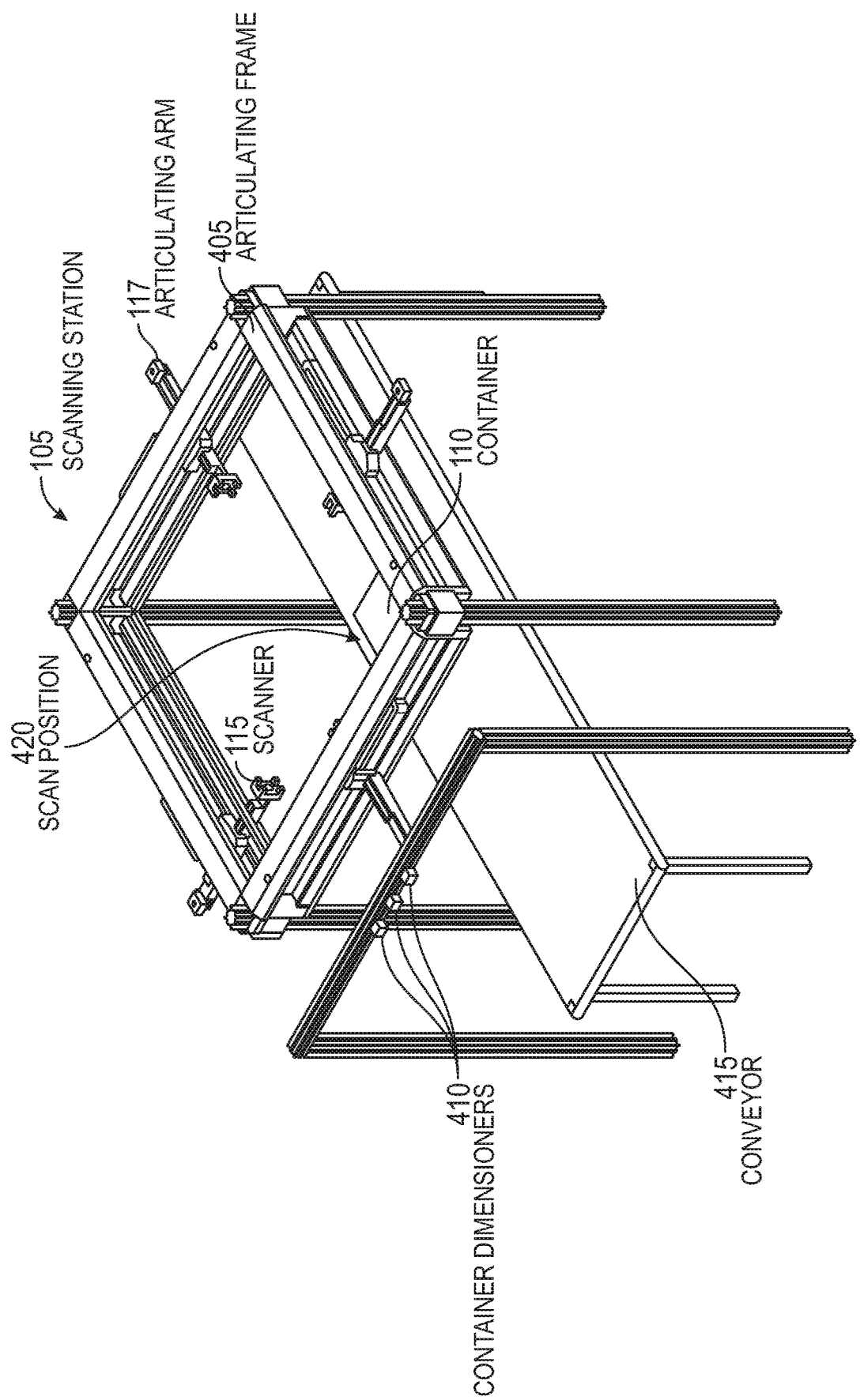

At block 310, the articulating arms move the scanners to a desired scan distance from respective sides of the container 110. As shown in FIG. 4B, the conveyor 415 has moved the container 110 in a scan position 420 within the articulating frame 405. For example, using the location and orientation of the container 110 learned by the container dimensioners 410, a conveyor controller can move the container 110 until it reaches the desired scan position 420 (e.g., a center of the articulating frame 405). Once at the scan position 420, the conveyor controller can stop the conveyor 415.

Figure 4C:
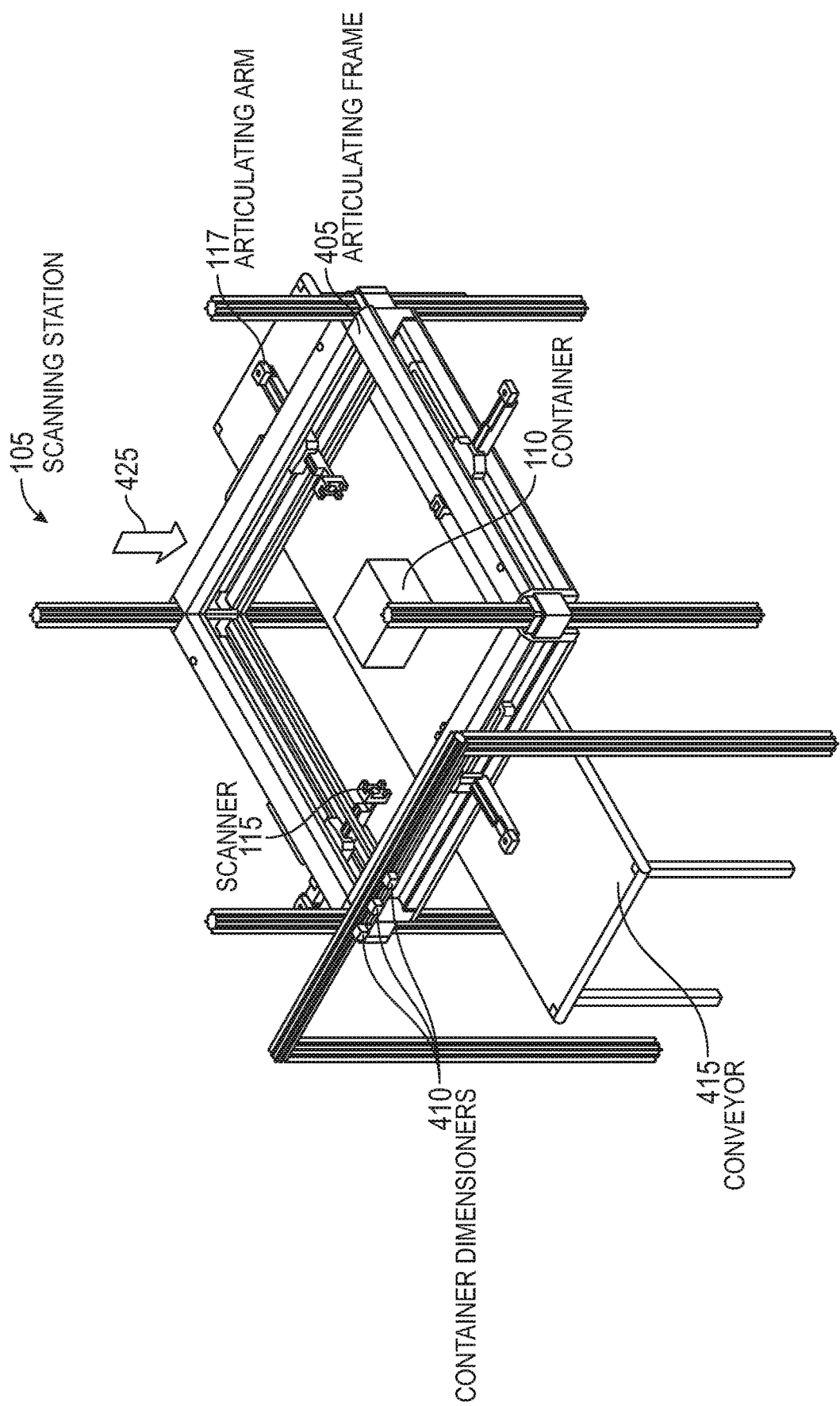

Once at the scan position 420, FIG. 4C illustrates lowering the articulating frame 405 in the direction of the arrow 425 until the articulating arms 117 and the scanners 115 align with a desired location of the container 110. This desired location may vary depending on the height of the container 110, which can be learned by the container dimensioners 410. For example, if the scanning station 105 wants to remove the top surface, the articulating frame 405 may lower the arms 117 until the scanners 115 align with corners in the container 110 where the top surface meets the side surfaces.

Figure 4D:
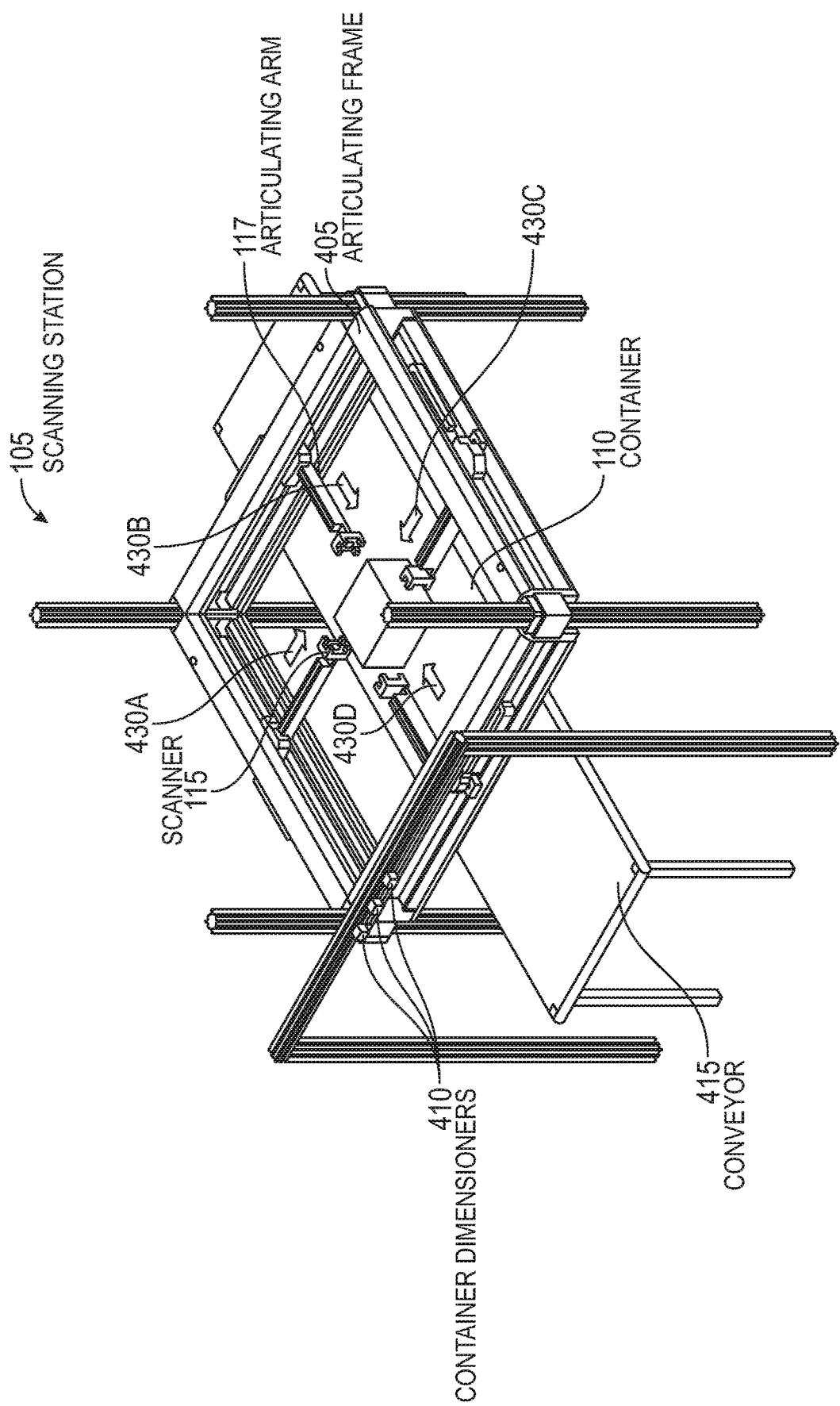

FIG. 4D illustrates extending the articulating arms 117 towards a respective side of the container 110 as shown by arrows 430A-D. That is, the scanning station 105 moves the arms 117 towards the container 110 until the scanners 115 are a desired scan distance from the sides of the container 110. In this embodiment, two of the articulating arms extend in a first direction while the other two of the articulating arms extend in a second direction perpendicular to the first direction.

In one embodiment, the scanning station 105 determines how far to extend the articulating arms 117 using the boundaries of the container 110 identified from the container dimensioners 410. In another embodiment, rather than disposing the dimensioners 410 upstream from the articulating frame 405, the depth sensors or time of flight sensor may be disposed at the end of the articulating arms 117 along with the scanners 115. The scanning station 105 can extend the arms 117 towards the container 110 until the depth sensors or time of flight sensors indicate the arms 117 have reached the desired scan distance. In yet another embodiment, the scanners 115 themselves could be used to estimate a distance between the articulating arms 117 and the containers 110 to determine when the desired scan distance has been reached. In any case, the desired scan distance establishes a gap between the scanners 115 and the sides of the container 110.

Figure 4E:
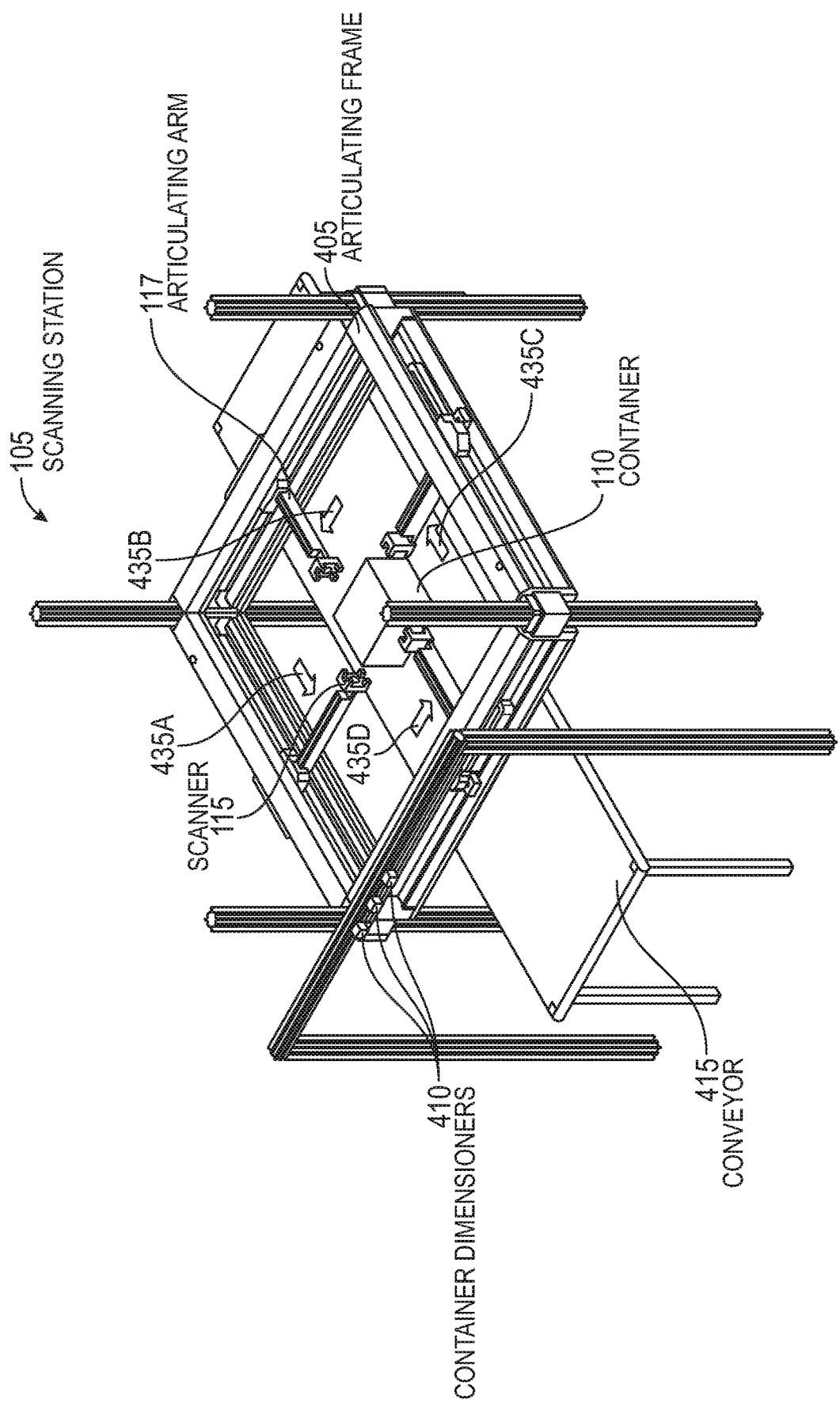

At block 315, the scanning station moves the scanners along a scan path across the surface. An example of the scan path is illustrated in FIG. 4E where the arrows 435A-D illustrate a direction each of the articulating arms 117 move in order to scan a respective side. In this example, the scan paths are in a common plane but the arms 117 move in different directions in that plane.

In one embodiment, the scanners 115 scan only a portion of the sides. For example, the scanners 115 may scan only a portion of the container 110 where the top surface and the sides meet. For example, the scanners 115 may scan only the top two or three centimeters of the sides of the container 110 that are closest to the top surface. In one embodiment, the articulating arms 117 perform only one scan (e.g., from left to right one time). However, in other embodiments, after performing a first scan (e.g., from left to right), the articulating frame 405 may lower the articulating arms 117 (or raise the articulating arms 117 depending on what height the first scan was performed) so another scan can be performed (e.g., a scan from right to left). In this manner, the scan process can be repeated so that a larger portion of the sides of the container 110 can be scanned. Although this may require more time, doing so may provide better resolution in the 3D image or may provide a more detailed view of the insides of the container 110.

As mentioned above, the scanners 115 emit an electromagnetic signal that at least partially penetrates the sides of the container 110. These electromagnetic signals can have the various frequencies or wavelengths described above. Moreover, by moving the scanners 115 using the articulating arms 117, SAR can be used to effectively increase the size of the aperture which can improve resolution relative to using stationary sensors. However, in one embodiment, scanners 115 that are not moved along scan paths may be used. In that example, the articulating arms 117 could include a horizontal row of scanners 115 which are moved into place around the periphery of the container 110 similar to what is shown in FIG. 4D. The scanners 115 could then be activated to generate a 3D image of the contents in the container 110 without the scanners being moved horizontally as shown in FIG. 4E. While this can decrease scanning time (since the articulating arms 117 do not need to be moved along the scan paths illustrated by the arrows 435 in FIG. 4E), having a row of scanners 115 for each side increases cost and also is less flexible to scanning containers 110 of different sizes.

In one embodiment, the scanners 115 can include a cascade of different radar chips aligned vertically (e.g., the direction perpendicular to the arrows 435) on the ends of the articulating arms 117. Each radar chip may include multiple antennas. Multiple-Input Multiple Output (MIMO), analog beamforming, or digital beamforming can be used to improve the resolution of each radar chip. Further, the radar chips can be cascaded where a synchronization signal (e.g., a clock signal) is provided to the chips which can further improve the resolution. Moving the cascaded radar chips when performing SAR can also improve the resolution. However, the embodiments herein are not limited to cascading radar chips or performing SAR. For example, SAR can be performed using only a single antenna by using the scan paths described above. Further, cascaded radar chips can be used even if the chips are not moved along the scan paths.

In one embodiment, rather than having the four articulating arms 117 and scanners 115 align with respective sides of the container 110 as shown in FIGS. 4D and 4E, the articulating arms 117 could be arranged vertically above the top surface such that all four scanners 115 are in facing relationship with the top surface of the container 110. For example, the scanners 115 may initially align with a respective corner of the top surface and then be moved along respective scan paths along the sides of the top surface towards a neighboring corner in the top surface. Doing so can result in a 3D image of the inside of the container around the periphery of the top surface similar to the 3D image generated by performing the scan in FIG. 4E.

Figure 4F:
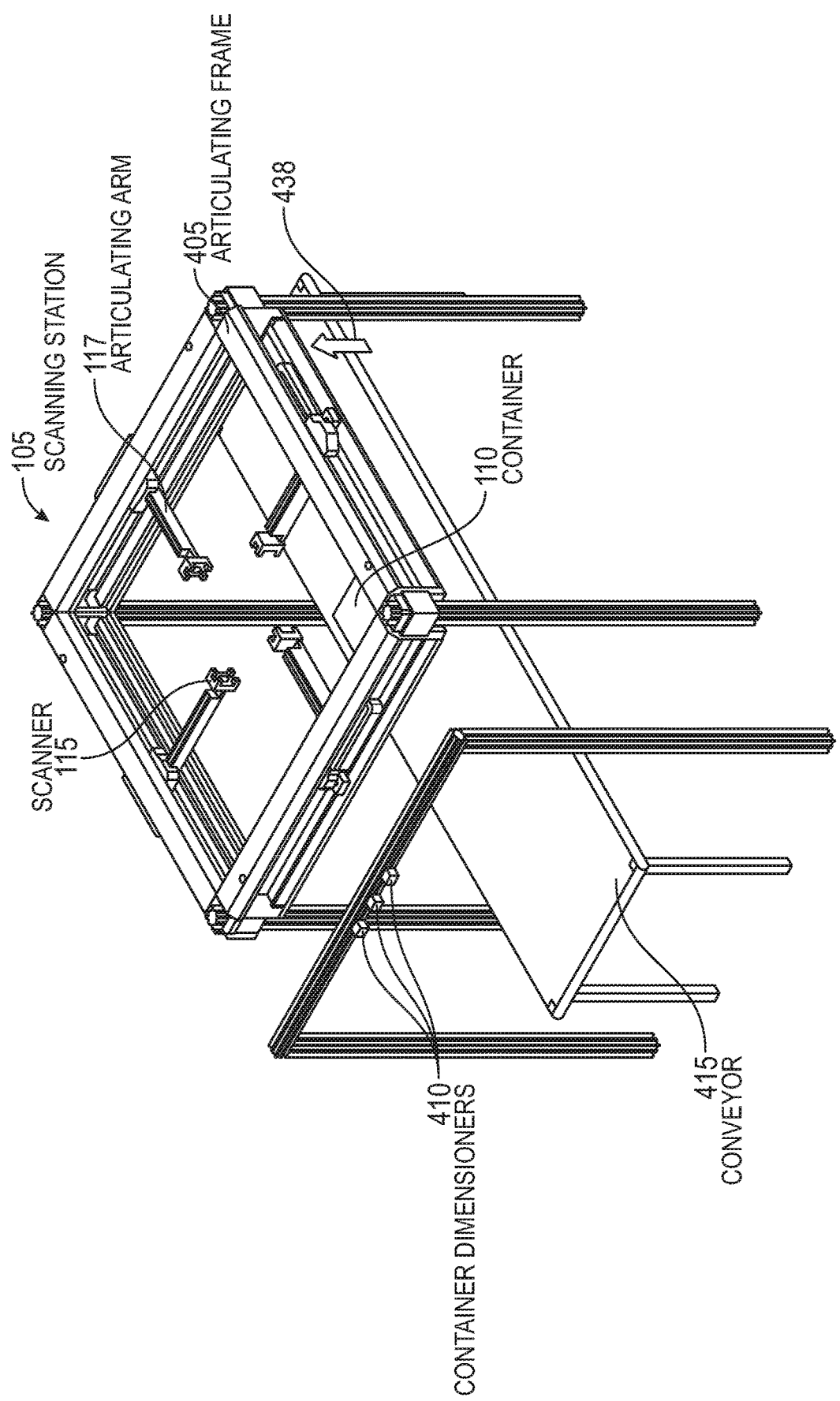
Figure 4G:
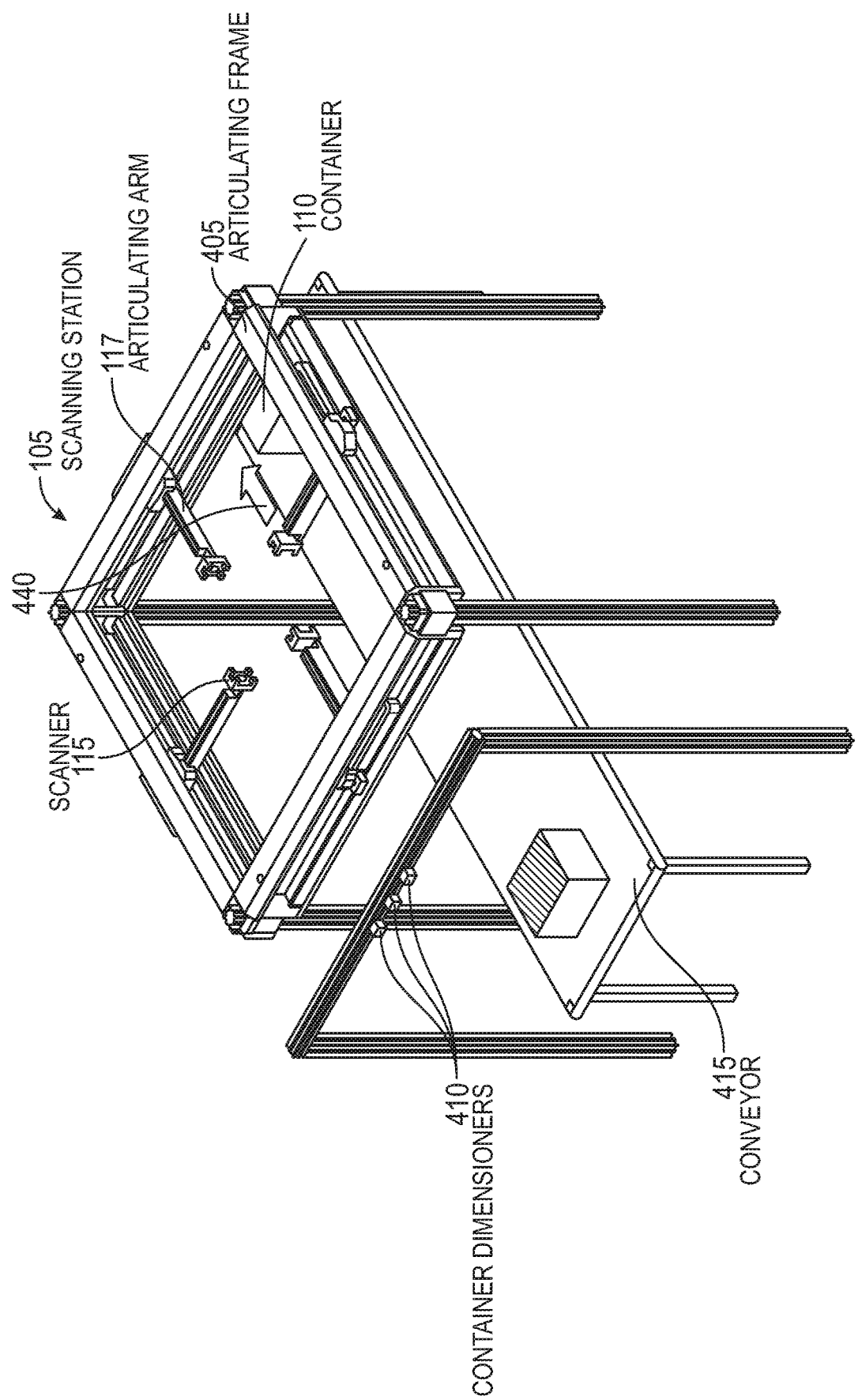

Once the scan is complete (which may include one scan path or multiple scan paths), FIG. 4F illustrates raising the articulated frame 405 as shown by arrow 438 so that the frame 405 and the articulating arms 117 are above the top surface of the container 110. This enables the conveyor 415 to then move the container 110 away from the scanning station 105 as illustrated by the arrow 440 in FIG. 4G. For example, the conveyor may then move the container 110 to a cutting station where the top surface of the container 110 is removed.

In one embodiment, the frame 405 includes motors or actuators for moving the frame vertically as well as moving the articulating arms 117 towards the container 110 as shown in FIG. 4D and moving the articulating arms 117 along the scan paths as shown in FIG. 4E.

At block 320, the 3D imager generates an image of the container around the top surface of the container. That is, the 3D imager uses the sensor information provided by the scanners 115 to generate an image of the contents proximate to the top surface of the container. This container image may include the corners in the box where the top surface intersects with at least one side surface, assuming the top surface is the surface to be removed in the cutting station.

Figure 5:
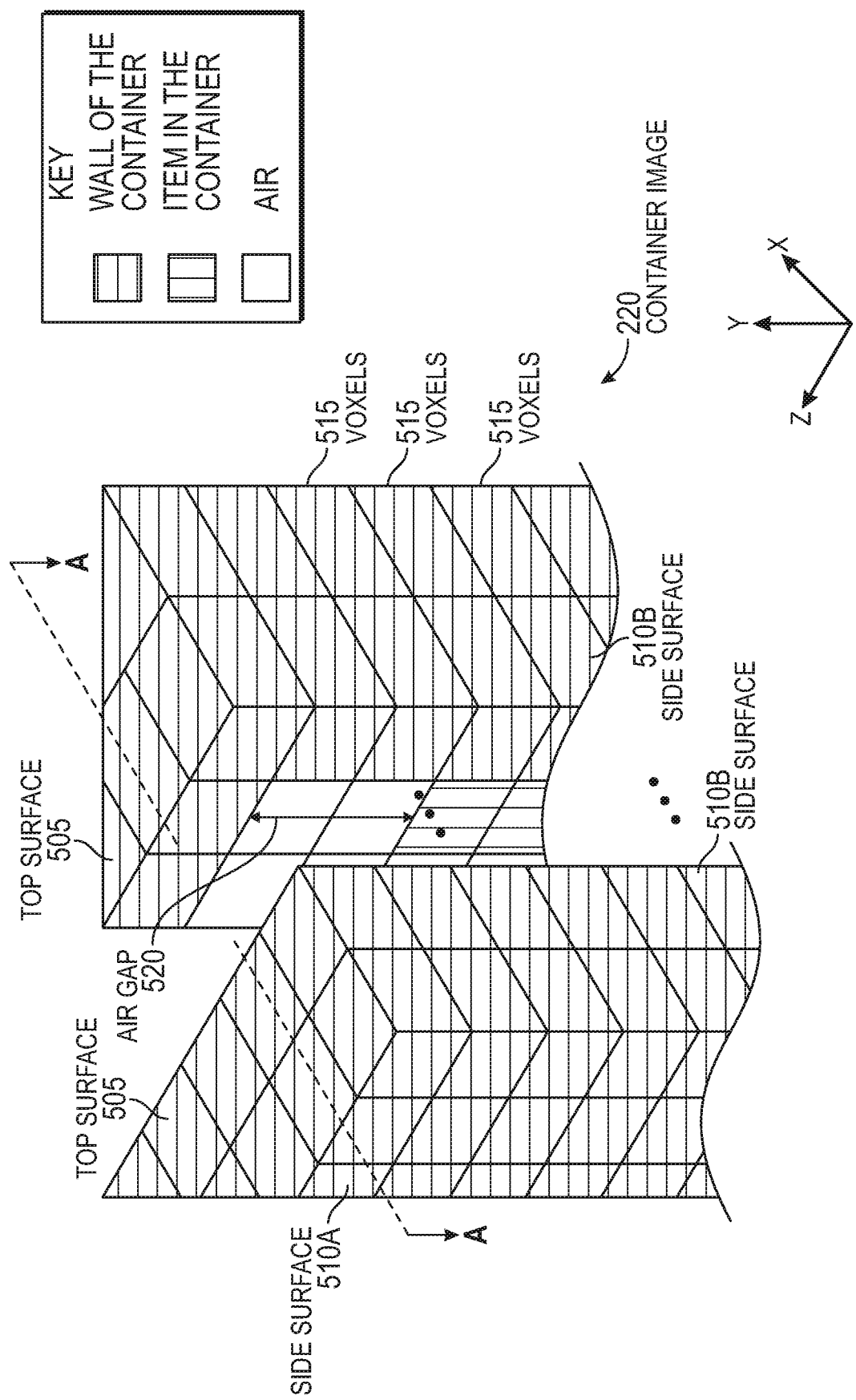
FIG. 5 illustrates a scanned image of a container, according to various embodiments.

FIG. 5 illustrates a scanned image of a container, according to various embodiments. The container image 220 in FIG. 5 includes plurality of volume pixels (voxels) 515. Generally, a voxel 515 indicates whether an object is present in the corresponding location in 3D space. That is, each voxel 515 indicates whether the corresponding space enclosed by the boundary of the voxel 515 is occupied or unoccupied. In this example, the voxels 515 represent walls of the container (e.g., a top surface 505 and side surfaces 510A and 510B), air in the container, and items in the container. The voxels 515 representing the walls of the container are illustrated by the horizontal hashing, while the voxels 515 representing the item(s) in the container are illustrated by the vertical hashing, and the voxels 515 representing the air in the container are illustrated with no hashing.

In this example, the thicknesses of the top surface 505 and the side surfaces 510A and 510B are one voxel 515 thick. The size of the voxels 515 depends on the resolution of the scanners 115. Generally, the better resolution (e.g., the smaller the resolution), the smaller the dimensions of the voxels 515 which enable the image 220 to better represent the objects in the container. For example, if each voxel has a width, height, and thickness of 0.1 mm, this means that the thickness of the material forming the top surface 505 and the side surfaces 510A and 510B are 0.1 mm thick or smaller. If the thickness of these walls were 0.2 mm, then there would be two layers of voxels 515 for each of the top surface 505 and the side surfaces 510A and 510B. If the container is a cardboard box, the thickness of cardboard can range from 0.1 mm to 9 mm.

In FIG. 5, the middle portion of the image 220 is omitted so that the insides of the container can be viewed. As shown, there are several voxels 515 without any shading that are between the voxels 515 representing the top surface 505 and the voxels 55 representing items stowed in the container. The number of voxels 515 between the top surface 505 and the items indicate an air gap 520. Again assuming that each voxel has a dimension of 0.1 mm, the value of the air gap 520 at the particular location illustrated in FIG. 5 is 0.2 mm (i.e., two voxels 515).

Although FIG. 5 illustrates an image 220 that extends only a handful of voxels 515 in the Z dimension (e.g., the depth dimension), the image 220 can extend several centimeters in this direction. Thus, to extend five centimeters into the Z direction (i.e., inside the container), the image 220 may contain 500 voxels in the Z dimension (assuming each voxel 515 has a depth of 0.1 mm in the Z direction). Thus, by evaluating the image 220, the 3D imager can identify the air gap 520 between the items and the top surface 505 at the corner of the side surfaces 510A and 510B for a depth of five centimeters into the container. Moreover, although not shown in FIG. 5, the image 220 can extend around all the sides that intersect with the top surface 505.

Figure 6:
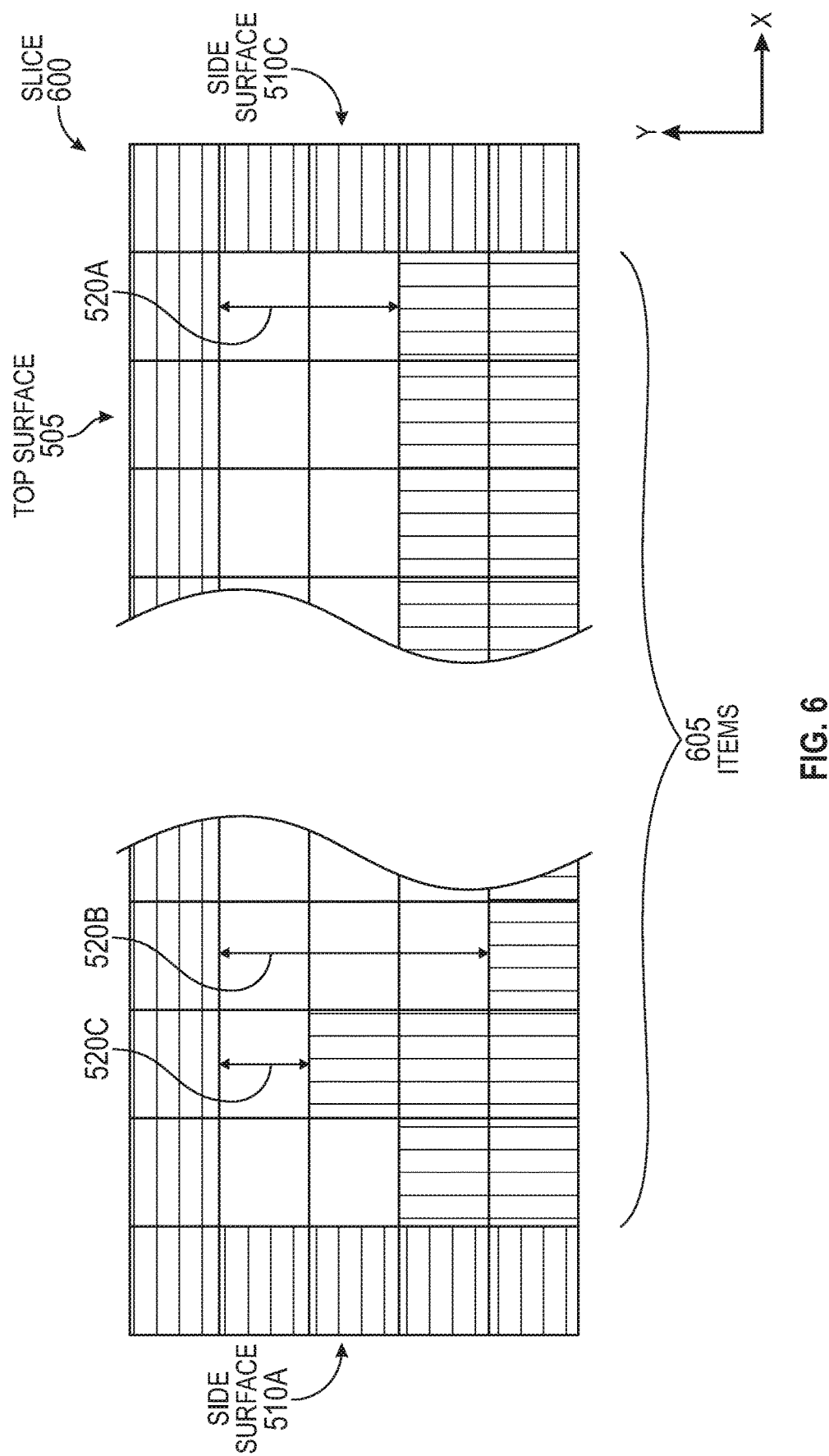
FIG. 6 illustrates a cross section of the scanned image in FIG. 5, according to various embodiments.

FIG. 6 illustrates a cross section of the scanned image in FIG. 5 along the line labeled A-A, according to various embodiments. That is, FIG. 6 illustrates a slice 600 of the image 220 illustrated in FIG. 5. More specifically, this slice 600 is taken at a set depth (in the Z direction) away from the side surface 510B, and thus, does not include any of the voxels representing the side surface 510B illustrated in FIG. 5.

The slice 600 includes the voxels 515 between the side surface 510A and an opposite side surface 510C (which was not viewable in FIG. 5). The slice 600 also includes the voxels 515 representing the top surface 505. However, because the scanner may have scanned at the intersection of the top surface 505 with the side surfaces 510, the slice 600 (and the image 220 in FIG. 5), may not extend to a bottom surface of the container in the Y direction. The distance of the image in the Y direction is configurable by changing the size of the aperture of the scanner (which may affect the resolution or the depth of the image) or by performing multiples scan paths (e.g., rastering the scanners over their respective sides). For clarity, the middle of the slice 600 is omitted so that the edges of the slice 600 as represented by the side surfaces 510A and 510C can be seen.

The voxels 515 representing the items 605 are shown as extending from the voxels 515 representing the side surface 510A to the side surface 510C. That is, the items may continuously extend between the surfaces 510A and 510C, but in other embodiments there may be gaps between the items 605 themselves, or gaps between the items 605 and the side surfaces 510A and 510C. These gaps would be captured in the slice 600 by voxels 515 without hashing (indicating the presence of air).

In slice 600, the items 605 do not have an even height which results in a varying air gap 520 along the length of the slice 600 in the X direction. For example, the air gap 520C has a thickness of only one voxel 515 while the air gap 520A has a thickness of two voxels 515 and the air gap 520B has a thickness of three voxels. The air gaps 520 can then be used to provide instructions for removing the top surface 505 at a cutting station.

At block 322, the 3D imager identifies a thickness of the top surface of the container using the image. The 3D imager can count the number of voxels forming the top surface of the container—e.g., the number of voxels in the Y direction of FIG. 6 forming the top surface 505. By knowing the thickness of each voxel as well as the number of voxels forming the top surface in the thickness direction in the image, the 3D imager can determine the overall thickness of the top surface. In one embodiment, the thickness represents the minimum blade depth needed to cut through the top surface.

At block 325, the 3D imager identifies an air gap between the top surface of the container and items in the container around the boundary. Using the slice 600 in FIG. 6 as an example, the 3D imager may use the smallest air gap 520 when recommending a blade depth of the cutter used to remove the top surface 505. For example, after determining the cut line, the 3D imager can evaluate the slices of the image along the cut line. That is, the slice 600 may extend along a portion of the cut line. Of course, given the accuracy of the cutting apparatus and the thickness of the blade (or saw) in the cutter, the 3D image may evaluate slices at various depths to determine the air gap.

Because the air gap 520 in FIG. 6 varies, the 3D imager may select the smallest air gap 520. The 3D imager can repeat this process along all the slices along the cut line to identify the smallest air gap in the cut line. Selecting the smallest air gap ensures that the cutter does not contact the items 605 regardless of the current location of the cutter on the cut line. However, in other embodiments it may be possible to dynamically control the depth of the cutter as it cuts along the cut line. In that case, the 3D imager may provide an air gap at each location along the cut line so the cutter can update its blade depth as it moves along the cut line which may make cutting the top surface 505 easier or faster.

In one embodiment, after evaluating the air gap along the desired cut line, the 3D imager can determine whether the air gap is sufficient. For example, at one point along the cut line, the items 605 may contact the top surface 505 such that it is impossible or difficult to cut through the top surface 505 without contacting the items 605. Or due to variability in the cutting process, the cutting station may require at least a five millimeter air gap along the entire length of the cut line. If the image 220 indicates the air gap 520 is insufficient, the 3D imager can select a different cut line and then again evaluate the container image 220. For instance, the 3D imager may move the cut line deeper into the top surface (e.g., further away from the side surfaces 510A-C to see whether there is a sufficient location along the new cut line. Thus, in one embodiment, the image 220 may have sufficient depth in the Z direction so that the 3D image can evaluate several locations of the cut line to determine whether there is a sufficient air gap 520 along its length. The 3D imager can then report the location of the cut line and its air gap to the controller of the cutter station or to an associate manning the cutter station.

At block 330, the cutter controller or an associate determines a blade depth and cut line location using the thickness of the top surface and the air gap provided by the 3D imager. That is, the cutter controller or the associate updates the blade depth of the cutter and proceeds to cut the top surface along the cut line indicated by the 3D imager. Doing so reduces the likelihood that cutting through the top surface 505 will damage the underlying items 605. However, determining the air gap is not necessary. In one embodiment, where the blade depth can be precisely controlled, it may be sufficient to determine only the thickness of the top surface and set the blade depth solely on the thickness of the top surface.

Further, determining the thickness of top surface is not necessary. In one embodiment, the 3D imager may assume the top surface has a certain thickness (e.g., the maximum possible thickness of cardboard box) and set the blade depth at this thickness. The 3D imager can then ensure the air gap is sufficient so that the blade does not strike any of the underlying items when the blade depth is set to the maximum thickness of the cardboard box. For example, if the air gap along the cut line is greater than the maximum thickness of the cardboard box, the blade will not contact the items stored in the box. Thus, the 3D image can determine only the thickness of the surface to be cut, only the air gap between the surface to be cut and the underlying items, or use a combination of the thickness and the airgap to determine the blade depth.

Figure 7:
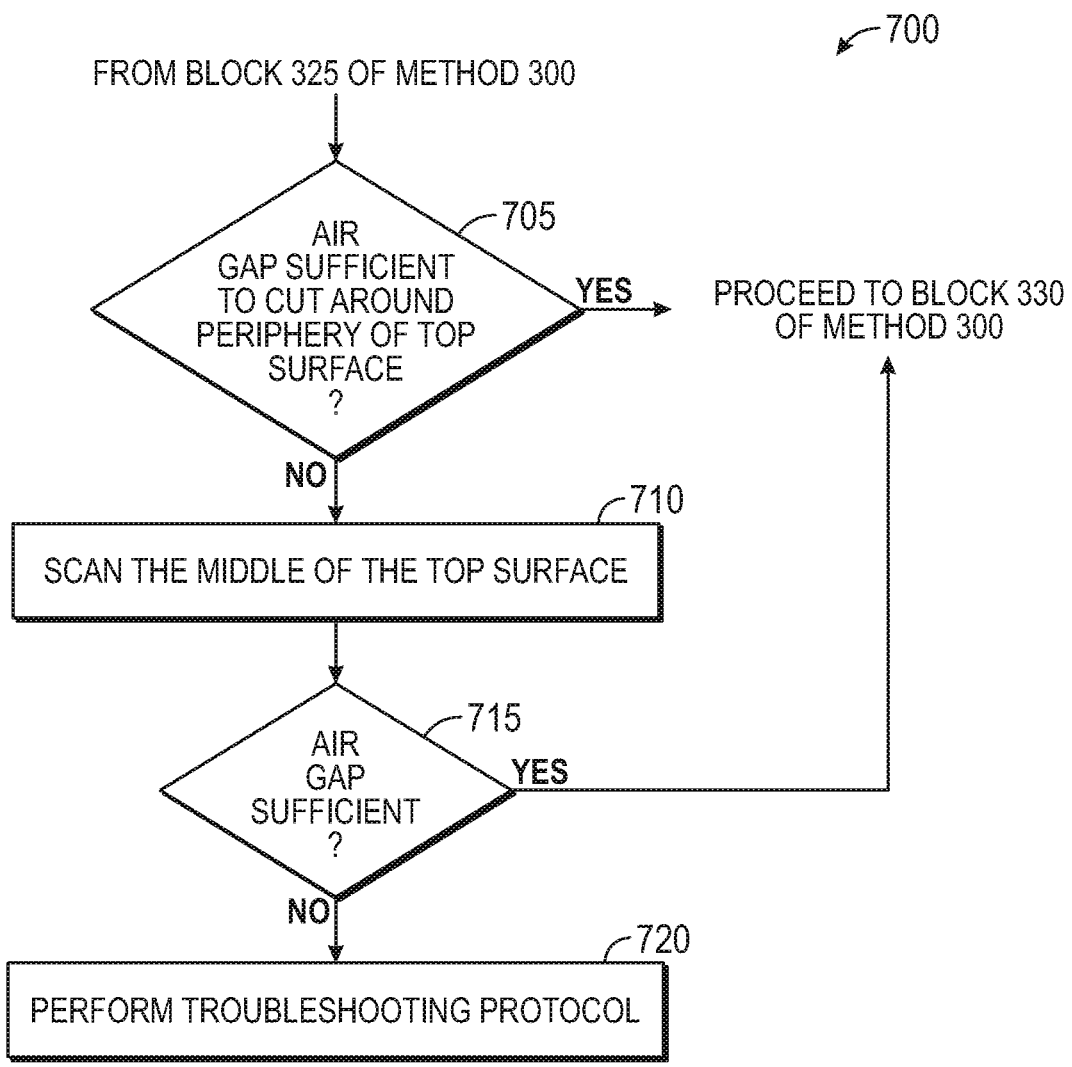
FIG. 7 is a flowchart for scanning a container when a preferred cut location is unavailable, according to various embodiments.

FIG. 7 is a flowchart of a method 700 for scanning a container when a preferred cut location is unavailable, according to various embodiments. The method 700 begins after block 325 of the method 300 where the 3D imager has identified an air gap (e.g., a minimum air gap) corresponding to a cut line (e.g., a default cut line at a first depth from the side surfaces of the container). At block 705, the 3D imager determines whether the air gap is sufficient to cut around the periphery of the top surface. For example, if the air gap for the default cut line is not sufficient, the 3D imager may evaluate different depths away from the side surfaces to determine whether cut lines disposed at those locations have sufficient air gaps. However, since the 3D container image may provide a view of only a few centimeters into the contents of the container, there may be an insufficient air gap at all the depths shown by the image. In that case, rather than proceeding to block 330 of the method 300, the method 700 proceeds to block 710 where the scanning station scans the middle of the top surface.

FIG. 8 illustrates scanning along a middle 805 of a container 110 to identify an air gap below its top surface, according to various embodiments. In FIG. 8, a scanning station 800 includes an articulating arm 117 that moves down the middle 805 of the container 110 as shown by arrow 810. As such, the 3D imager can capture an image of the container 110 in a depth (D) direction to determine whether there is a sufficient air gap beneath the middle 805 of the container 110.

In this example, the top surface of the container 110 is formed by flaps 815A and 815B. When the container 110 arrives at the warehouse, the flaps 815A and 815 are sealed together using packing tape at the middle 805 of the container 110. Thus, rather than cutting around a periphery of the top surface (to remove the flaps 815A and 815B as a whole), the cutting station can cut along the middle 805 which permits the flaps 815A and 815B to raise in opposite directions so that the items in the container 110 are accessible.

In one embodiment, the articulating arm 117 is attached to the same articulating frame 405 illustrated in FIGS. 4A-4G. In one embodiment, block 710 of the method 700 is performed after FIG. 4E where the articulating arms 117 have scanned the respective sides of the container 110. Before lifting up the frame 405 as illustrated in FIG. 4F, the 3D imager may first determine whether the air gap around the periphery of the container 110 is sufficient. If insufficient, the articulating arm 117 illustrated in FIG. 8 can then be moved to the location illustrated in FIG. 8 and further moved in the direction of the arrow 810 to determine whether the air gap along the middle 805 of the container is sufficient.

However, in another embodiment, rather than performing the scan illustrated in FIG. 4F separately from the scan illustrated in FIG. 8, the scanning station 105 may perform at least a portion of both scans in parallel. For example, while the articulating arms 117 in FIG. 4F scan the container 110, the articulating arm 117 in FIG. 8 scans the middle 805 of the container 110. Thus, the 3D imager can generate two 3D container images in parallel and then determine where to place the cut line without having to wait on another scan.

At block 715, if the air gap is sufficient at the middle of the container, the method 700 proceeds to block 330 of method 300 where the 3D imager provides the air gap information and the cut line location to the cutting station. However, if not, the method 700 proceeds to block 720 where the scanning station performs a troubleshooting protocol. For example, the container may be moved to a special station where a trained associate opens the container using a special protocol or tool.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
identifying a boundary of a sealed cardboard box;
moving a plurality of articulating arms to desired scan distances from respective sides of the cardboard box, wherein synthetic aperture radar (SAR) scanners are mounted on ends of the plurality of articulating arms in facing relationships with the respective sides of the cardboard box;
moving the SAR scanners along scan paths across the respective sides using the plurality of articulating arms;
generating a 3D image of an inside of the cardboard box using sensor data provided by the SAR scanners, wherein the 3D image includes a view of the inside of the cardboard box around a periphery of a top surface of the cardboard box;
identifying an air gap between the top surface and one or more items stowed in the cardboard box; and
determining, based on the air gap, a blade depth of a cutting apparatus to use when cutting through the top surface.

2. The method of claim 1, further comprising:
determining a location of a cut line along the top surface using the air gap, wherein the cardboard box has a minimum air gap along a length of the cut line.

3. The method of claim 1, further comprising:
determining, based on the 3D image, that a first proposed cut line does not have a sufficient air gap between the top surface and the one or more items; and
identifying, after rejecting the first proposed cut line, a second proposed cut lie associated with the air gap, wherein the air gap is sufficient for cutting through the top surface using the cutting apparatus without contacting the one or more items.

4. The method of claim 1, further comprising, before moving the plurality of articulating arms to the desired scan distances:
moving the cardboard box along a conveyor to a scan location, wherein the scan location is within a boundary of a frame on which the plurality of articulating arms are mounted; and
lowering the frame such that the SAR scanners are in the facing relationships with the respective sides of the cardboard box.

5. The method of claim 4, further comprising, after moving the SAR scanners along the scan paths:
raising the frame such that the SAR scanners are above the top surface of the cardboard box; and
moving the cardboard box along the conveyor to a downstream processing station.

6. A method comprising:
moving an articulating arm to a desired scan distance from a first side of a sealed container, wherein an electromagnetic scanner is mounted on an end of the articulating arm in a facing relationship with the first side of the sealed container;
generating a 3D image of an inside of the sealed container using sensor data provided by the electromagnetic scanner;
identifying, using the 3D image, a thickness of at least one of the first side or a second side of the sealed container; and
determining, based on the thickness, a blade depth of a cutting apparatus to use when cutting through at least one of the first or second sides.

7. The method of claim 6, wherein the electromagnetic scanner emits radar signals to generate the sensor data.

8. The method of claim 7, further comprising:
moving the articulating arm along a scan path across the first side when the electromagnetic scanner emits the radar signals.

9. The method of claim 6, further comprising:
moving a plurality of articulating arms to desired scan distances from the sealed container, wherein a plurality of electromagnetic scanners are mounted on ends of the plurality of articulating arms, wherein the 3D image is generated from sensor data provided by the plurality of electromagnetic scanners, and wherein the 3D image includes a view of the inside of the sealed container where the first side intersects with the second side.

10. The method of claim 6, further comprising:
identifying a proposed cut line on at least one of the first or second sides;
identifying, using the 3D image, an air gap between at least one of the first side or the second side of the sealed container and an item stowed in the sealed container; and
determining whether the air gap along the proposed cut line satisfies a minimum air gap.

11. The method of claim 10, further comprising:
moving a second articulating arm to the desired scan distance from a top surface of the sealed container, wherein a second electromagnetic scanner is mounted on a second end of the second articulating arm in a facing relationship with the top surface, wherein the top surface is defined by the second side;
generating a second 3D image of the inside of the sealed container using sensor data provided by the second electromagnetic scanner;
identifying a second air gap between the top surface and another item stowed in the sealed container;
identifying a second proposed cut line on the top surface; and
determining that the second air gap along the second proposed cut line satisfies the minimum air gap.

12. The method of claim 6, wherein the 3D image comprises a plurality of volume pixels, called voxels, each of the voxels indicating whether an enclosed volume is occupied or unoccupied space, wherein the voxels include a first subportion of voxels representing the first side and a second subportion of voxels representing the second side, and wherein the 3D image extends at most five centimeters into the inside of the sealed container relative to any side of the sealed container.

13. A system, comprising:
a frame;
a plurality of articulating arms; and
a plurality of scanners mounted on the plurality of articulating arms, wherein the plurality of scanners are configured to emit wireless signals with a frequency between a range of 30 MHz to 500 GHz for viewing an inside of a sealed container,
wherein the frame is configured to move the plurality of articulating arms along respective scan paths when emitting the wireless signals.

14. The system of claim 13, wherein a first articulating arm and a second articulating arm of the plurality of articulating arms extend in a first direction and a third articulating arm and a fourth articulating arm of the plurality of articulating arms extend in a second direction perpendicular to the first direction.

15. The system of claim 14, wherein the first, second, third, and fourth articulating arms are arranged in the frame to face different sides of the sealed container.

16. The system of claim 14, wherein the frame is configured to extend the first, second, third, and fourth articulating arms in the first and second directions towards the sealed container until respective desired scan distances between the first, second, third, and fourth articulating arms and the sealed container are reached.

17. The system of claim 14, wherein the frame is configured to move the first, second, third, and fourth articulating arms along the respective scan paths that lie in a common plane when emitting the wireless signals from the plurality of scanners.

18. The system of claim 13, wherein the frame is configured to lift the plurality of articulating arms vertically in a direction perpendicular to a surface of the earth.

19. The system of claim 13, wherein the plurality of scanners comprise SAR scanners.

20. The system of claim 19, wherein each of the plurality of scanners comprises a plurality of cascaded radar chips that are synchronized using a synchronization signal.

* * * * *

UNITED STATES PATENT AND TRADEMARK OFFICE
CERTIFICATE OF CORRECTION

| | | |
|---|---|---|
| PATENT NO. | : 11,035,951 B1 | Page 1 of 1 |
| APPLICATION NO. | : 16/369573 | |
| DATED | : June 15, 2021 | |
| INVENTOR(S) | : Sean Murphy et al. | |

It is certified that error appears in the above-identified patent and that said Letters Patent is hereby corrected as shown below:

In the Claims

In Column 13, Line 57, in Claim 3, delete "lie" and insert -- line --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*